US010320721B2

United States Patent
Ground, Jr. et al.

(10) Patent No.: US 10,320,721 B2
(45) Date of Patent: Jun. 11, 2019

(54) SETTING, VISUALIZING AND PREDICTING AN AVAILABILITY STATUS OF AN INDIVIDUAL FOR A MESSAGING APPLICATION

(71) Applicant: INTERNATIONAL BUSINESS MACHINES CORPORATION, Armonk, NY (US)

(72) Inventors: James C. Ground, Jr., Wappingers Falls, NY (US); Rolando Perez, West Seneca, NY (US); Christopher A. Robbins, Monroe Township, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 270 days.

(21) Appl. No.: 15/260,592

(22) Filed: Sep. 9, 2016

(65) Prior Publication Data

US 2018/0077090 A1    Mar. 15, 2018

(51) Int. Cl.
G06F 15/16    (2006.01)
H04L 12/58    (2006.01)
G06Q 50/00    (2012.01)
G06Q 10/10    (2012.01)

(52) U.S. Cl.
CPC ......... *H04L 51/043* (2013.01); *G06Q 10/107* (2013.01); *G06Q 50/01* (2013.01); *H04L 51/20* (2013.01)

(58) Field of Classification Search
CPC ..... H04L 51/043; H04L 51/20; G06Q 10/107; G06Q 50/01

USPC ......................................................... 709/206
See application file for complete search history.

(56) References Cited

U.S. PATENT DOCUMENTS

| 7,493,369 B2 | 2/2009 | Horvitz et al. |
| 2004/0122730 A1* | 6/2004 | Tucciarone .......... G06Q 10/107 705/14.36 |
| 2006/0069686 A1 | 3/2006 | Beyda et al. |
| 2012/0290726 A1 | 11/2012 | Brown et al. |

(Continued)

OTHER PUBLICATIONS

Anonymous "Method and System for Analytic Model and Data Visualization on Mobile Devices" IP.com No. IPCOM000236178D; dated Apr. 11, 2014; 4 pgs.

(Continued)

*Primary Examiner* — Sm A Rahman
(74) *Attorney, Agent, or Firm* — Cantor Colburn LLP; William Kinnaman (57) ABSTRACT

Methods, systems and computer program products for determining and providing an availability status of an individual in a messaging application are provided. Aspects include obtaining historical usage data for the individual for the messaging application, obtaining location data, activity data and calendar data for the individual, and calculating a current availability status for the individual based on the historical usage data, the location data, the activity data and the calendar data. Aspects also include calculating a predicted future availability status for the individual based on the historical usage data, the location data, the activity data and the calendar data and providing the current availability status and the predicted future availability status to other users of the messaging application.

14 Claims, 4 Drawing Sheets

(56) References Cited

U.S. PATENT DOCUMENTS

2015/0341290 A1\* 11/2015 Cherifi .................. H04L 51/043
709/206

OTHER PUBLICATIONS

Anonymous "System, Method and Heuristics to Visualize Meeting Availability and Meeting Confidence", IP.com No. IPCOM000210094D; dated Aug. 25, 2011; 5 pgs.

\* cited by examiner

SETTING, VISUALIZING AND PREDICTING AN AVAILABILITY STATUS OF AN INDIVIDUAL FOR A MESSAGING APPLICATION

BACKGROUND

The present invention generally relates to an availability status of an individual in a messaging application, and more particularly to methods and systems for setting, visualizing and predicting an availability status of an individual in a messaging application.

In typical messaging applications, users manually set an availability status that is displayed to other users, which are used to convey the availability of the user for communication via the messaging application. In general, the messaging applications allow users to select their availability status from a small, discrete set of predefined availability status values such as "Available," "Away," "In a Meeting," or the like.

In many cases, this limited set of availability status values does not always include an option that accurately represents the actual status of a user. In addition, the availability statuses of users are often inaccurate due to the requirement that the availability status be updated manually and because many users do not update their availability status throughout the day as their availability changes.

While some messaging applications do allow the automatic setting of a specific availability status based on events such as the amount of time that has passed since the last activity of a user's keyboard, these settings need to be manually configured and updated by the user and the available configuration options are relatively basic. In addition, the basic metrics may not provide an accurate representation of the individual's availability status.

SUMMARY

In accordance with an embodiment, a method for determining and providing an availability status of an individual in a messaging application includes obtaining historical usage data for the individual for the messaging application and obtaining location data, activity data and calendar data for the individual. The method also includes calculating a current availability status of the individual based on the historical usage data, the location data, the activity data and the calendar data and calculating a predicted future availability status for the individual based on the historical usage data, the location data, the activity data and the calendar data. The method also includes providing the current availability status and the predicted future availability status to other users of the messaging application.

In another embodiment of the invention, a processing system for determining and providing an availability status of an individual in a messaging application includes a processor configured to control a content displayed on a display screen. The processor is configured to obtain historical usage data for the individual for the messaging application and to obtain location data, activity data, and calendar data for the individual. The processor is also configured to calculate a current availability status of the individual based on the historical usage data, the location data, the activity data and the calendar data and to calculate a predicted future availability status for the individual based on the historical usage data, the location data, the activity data and the calendar data. The processor is further configured to provide the current availability status and the predicted future availability status to other users of the messaging application.

In accordance with a further embodiment, a computer program product for determining and providing an availability status of an individual in a messaging application includes a non-transitory storage medium readable by a processing circuit and storing instructions for execution by the processing circuit for performing a method. The method includes obtaining historical usage data for the individual for the messaging application and obtaining location data, activity data and calendar data for the individual. The method also includes calculating a current availability status of the individual based on the historical usage data, the location data, the activity data and the calendar data and calculating a predicted future availability status for the individual based on the historical usage data, the location data, the activity data and the calendar data. The method also includes providing the current availability status and the predicted future availability status to other users of the messaging application.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments include methods, systems, and computer program products for determining and providing an availability status of an individual in a messaging application. In exemplary embodiments, the availability status of an individual is calculated and displayed as a numerical value that indicates the level of availability of the individual for communicating via the messaging application. The numerical score is calculated based on machine learning and data analytic techniques that take a wide variety of variables related to the individual into account. In exemplary embodiments, in addition to a current availability status being calculated and provided, a predicted future availability status of the individual is also calculated and provided. In exemplary embodiments, both the current availability status and the predicted future availability status of an individual are calculated and updated automatically based on the actions of the individual. The availability status and the predicted future availability status are provided to users of the messaging application via color graphical user interfaces such that the availability of the other users for communication via the messaging application is readily apparent.

Figure 1:
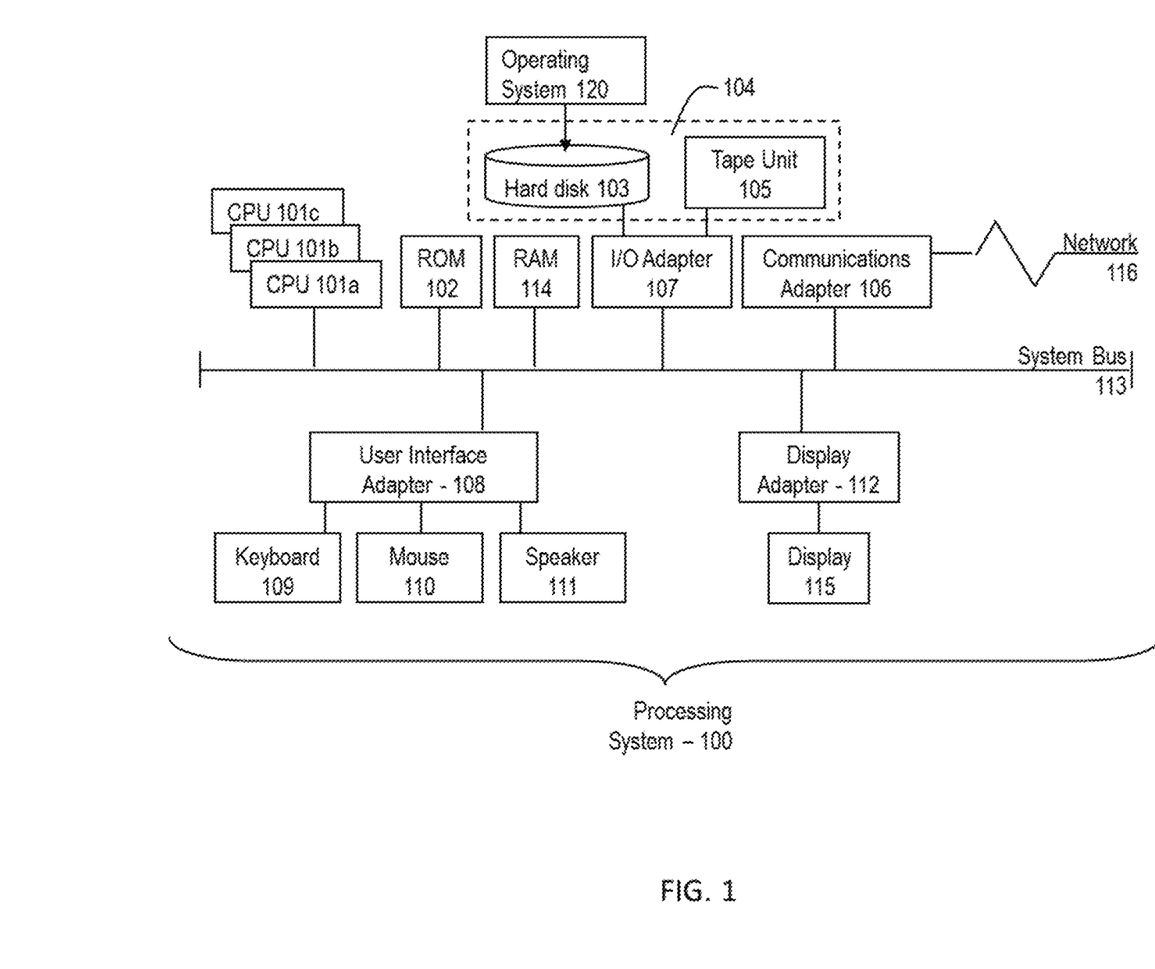
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the processing system 100 includes processing capability in the form of processors 101, storage capability including the system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
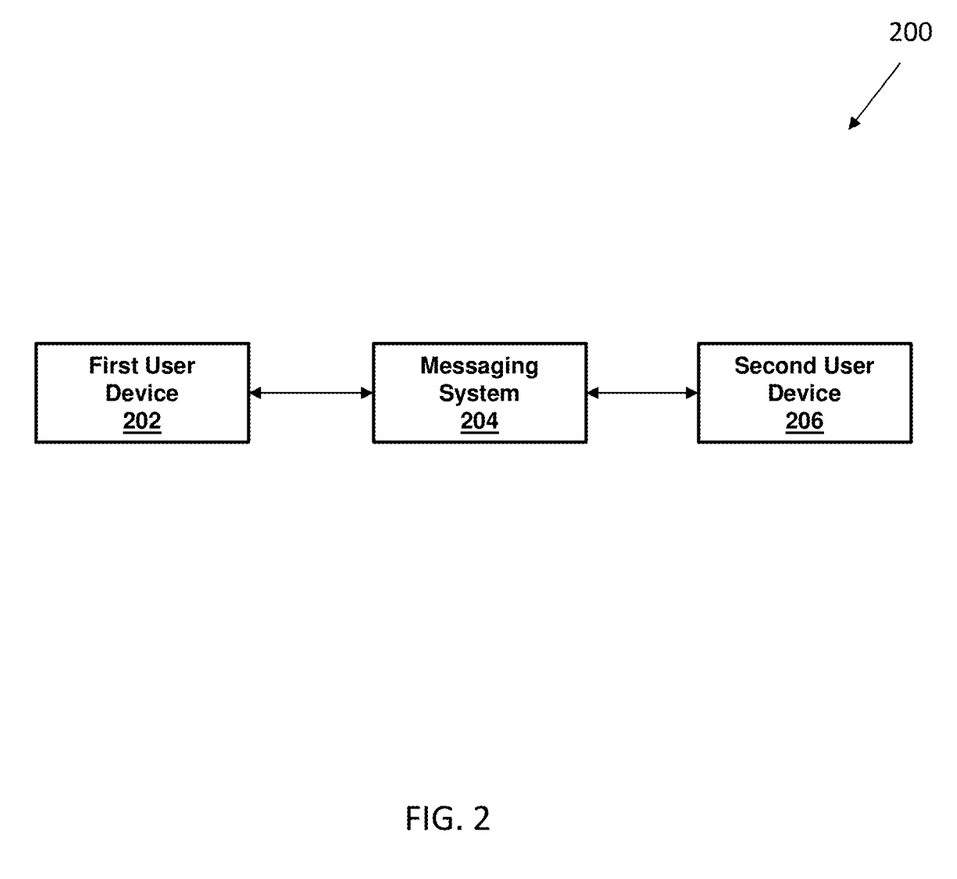
FIG. 2 is a block diagram illustrating a messaging system for practice of the teachings herein.

Referring now to FIG. 2, there is shown a messaging system 200 for implementing the teachings herein. As illustrated, the messaging system 200 includes a first user device 202, a messaging system 204 and a second user device 206. In exemplary embodiments, the first user device 202 may be a processing system as shown in FIG. 1, a smartphone, a tablet, or another suitable device that includes a messaging application. Likewise, the second user device 206 may be a processing system as shown in FIG. 1, a smartphone, a tablet, or another suitable device that includes a messaging application. Both the first user device 202 and the second user device 206 are in communication with a messaging system 204, which facilitates the exchange of messages between the first user device 202 and the second user device 206. In exemplary embodiments, both the first user device 202 and the second user device 206 include a messaging application that includes a graphical user interface (GUI) that is used to exchange messages.

Figures 3A, 3B, 3C:
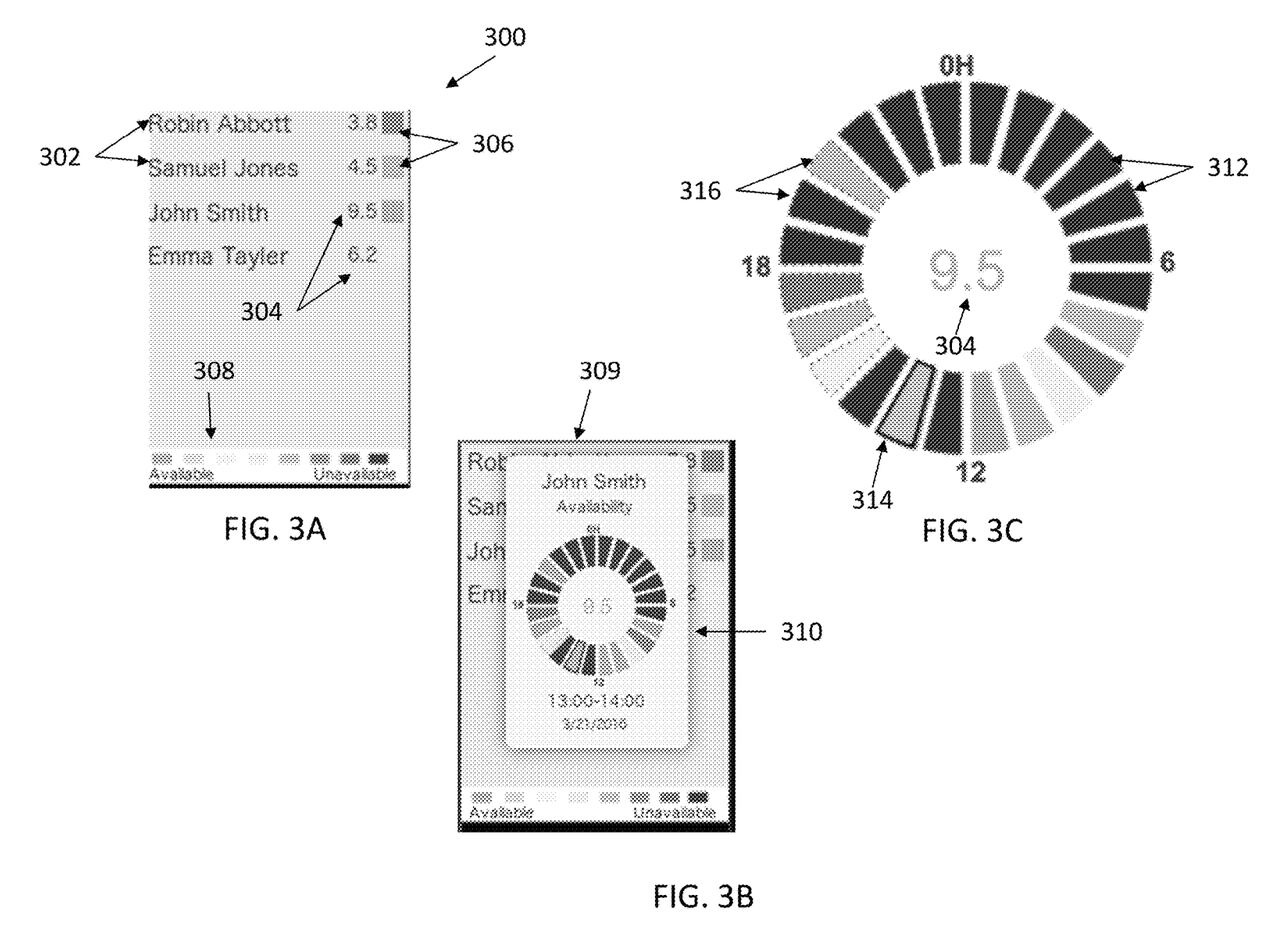
FIGS. 3A, 3B, and 3C are illustrations of graphical user interfaces for providing an availability status of an individual in a messaging application in accordance with an embodiment.

Referring now to FIGS. 3A, 3B and 3C illustrations of GUIs 300, 309 for visualizing the availability statuses of individuals in a messaging application in accordance with an embodiment are shown.

As shown in FIG. 3A, the GUI 300 includes a list of contacts 302 of the user of the GUI 300. Each of the contacts 302 is listed with a current availability status score 304 and an associated color indicator 306. In exemplary embodiments, the current availability status score 304 is a numerical value that is greater than or equal to a minimum number, for example zero, and less than or equal to a maximum number, for example ten. In one embodiment, the availability status score 304 includes only one decimal place. In exemplary embodiments, a pigment of the color indicator 306 is determined based on the numerical value of the current availability status score 304. In one embodiment, the GUI 300 also includes a legend 308 that provides a correlation between the pigment of the color indicator 306 and the availability of the contact 302. In one embodiment, an availability status score of zero corresponds to a red color indicator and an availability status score of zero corresponds to a green color indicator. In exemplary embodiments, a user may initiate a message to one of the listed contacts 302 by clicking on the contact.

In exemplary embodiments, a user can use the GUI 300 to request a predicted future availability status of one of the contacts 302. In exemplary embodiments, the user may select to view the predicted future availability for the selected contact by double clicking on the contact 302, by a long click on the contact 302 or by another suitable means. In response to a request to view the predicted future availability for the selected contact, the GUI 309 shown in FIG. 3B is displayed. The GUI 309 includes a predicted future availability status 310 for the selected contact.

As best shown in FIG. 3C, the predicted future availability status 310 for the selected contact includes the current availability status score 304 displayed in a central portion of the predicted future availability status 310. In exemplary embodiments, the pigment of the current availability status score 304 is determined based on the numerical value of the current availability status score 304 according to the legend 308. In exemplary embodiments, the predicted future availability status 310 includes a plurality of availability status indicators 312, 314, 316, which each represent an hour of the current day.

In exemplary embodiments, the plurality of availability status indicators 312, 314, 316 are arranged in a radial manner around the current availability status score 304. In exemplary embodiments, the pigment of the availability status indicators 312, 314, 316 are determined based on a numerical value of the availability status score that corresponds to the time period of the availability status indicators 312, 314, 316. In one embodiment, status indicators 312 refer to recent availability statuses of the selected contact and the status indicator 314 refers to the current availability status of the selected contact. In exemplary embodiments, the status indicator 314 is visually distinguishable from the status indicators 312 by a solid black line around the status indicator 314. In one embodiment, the status indicators 316 refer to predicted future availability status scores for each hour remaining in a current day for the selected contact. In exemplary embodiments, the status indicators 316 are visually distinguishable from the status indicators 314 by a dashed black line around the status indicators 316. In other embodiments, the messaging application can be configured to show the predicted future availability scores through the next week or month and beyond if needed. The predicted scores allow a user to select the best time to begin chatting with a contact, rather than having to decide based upon only current availability status information.

In one embodiment, the contacts 302 shown in the GUI 300 can be sorted by their current availability status scores 304. In addition, the GUI 300 can be configured to only display contacts that have a minimum current availability status score 304. In exemplary embodiments, the GUI 309 may include an operation that allows a user to enter a desired availability threshold value for the contact and that will responsively display an estimated time that availability status score for the selected contact will be above a desired availability threshold value.

In exemplary embodiments, the current availability status score is automatically calculated based on a combination of machine learning and data analytics techniques that take a variety of variables into account. These variables include historical usage data for the individual for the messaging application, location data for the individual for the messaging application, activity data for the individual for the messaging application and calendar data for the individual for the messaging application. More specifically, these variables can include, but are not limited to, an availability status that is provided by the individual, a historical usage pattern of the messaging application of the individual, an activity of the individual on the device executing the messaging application (i.e., a keyboard or mouse activity on a computer, or a movement of a smartphone), a recent message response time of the individual via the messaging application, a location of an individual, a last detected type of device on which the individual used the messaging application, and extracted availability time from a calendar application.

In exemplary embodiments, the location of the individual can include information such as the individual being at a known location, such as at home or at work. The location data for the individual can also include more generic location information such as a time zone of the individual or a geographic location of the individual. In addition, the location data for the individual can also include GPS location data and velocity, which can be coordinated with map data, such as roads, railways, and buildings. In exemplary embodiments, based on the type of the user and based on the location of the individual, the processing application can automatically set the current availability status score. For example, if an individual is determined to be at a hospital or in a courthouse but the individual does not work in such a building (i.e., the individual is not a lawyer, doctor, nurse, judge or the like), the processing system can set the current availability status score to zero until the individual leaves that location.

In exemplary embodiments, the availability status scores are calculated using machine learning and predictive analytics techniques based upon the previous usage of the individual of the messaging application. The previous usage of the messaging application involves the analysis of multiple individual state variables along with the corresponding user responsiveness to incoming conversation requests via the messaging application. The individual state variables include, but are not limited to, a manually set discrete user availability status, a date and time, a day of the week, a user keyboard and mouse activity, currently open applications and current application with focus, extracted availability time from calendar meetings, physical activity of the individual (based on GPS tracking and velocity), and message response time. In exemplary embodiments, the machine learning and predictive analytics techniques can be primed with logical baseline correlations, such as a development environment being the currently focused application contributing significantly to unavailability. The predicted future availability status score can be calculated using the same model for generating current availability status scores.

Figure 4:
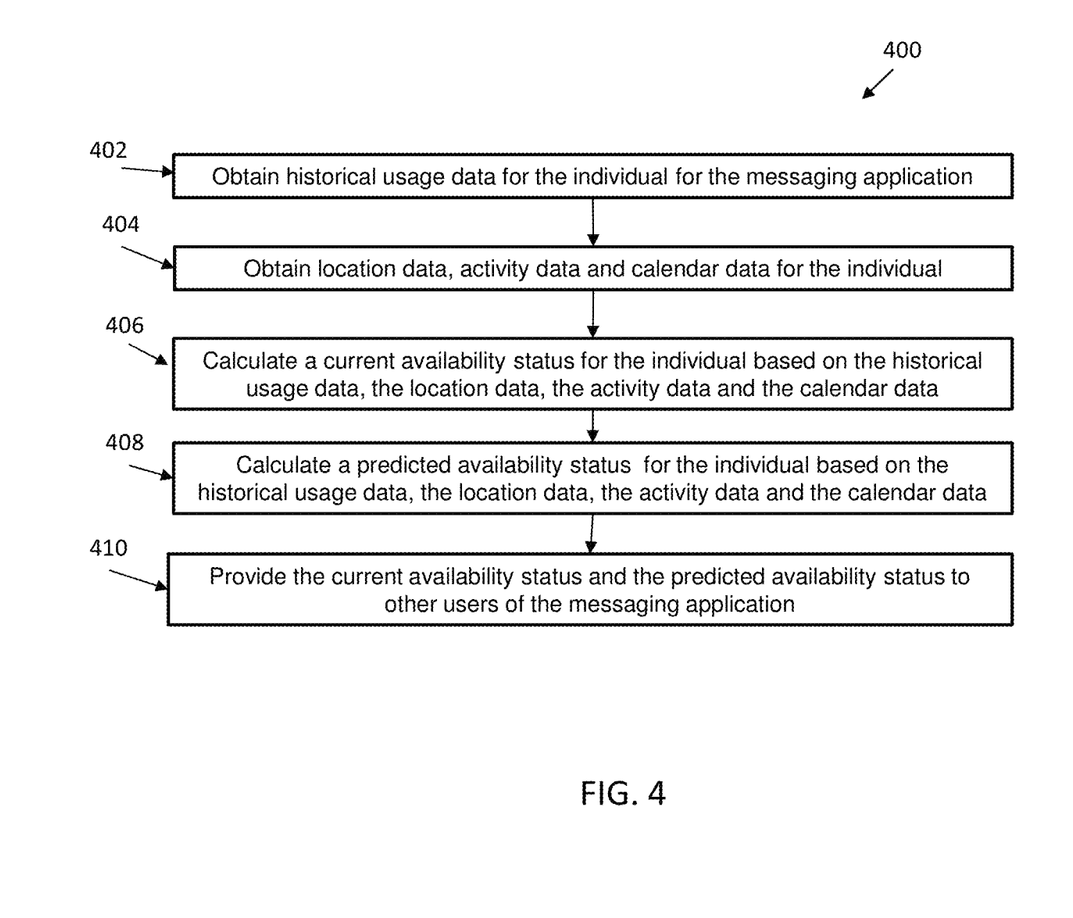
FIG. 4 shows a flow chart illustrating a method for determining and providing an availability status of an individual in a messaging application in accordance with an embodiment.

Referring now to FIG. 4, a method 400 for determining and providing an availability status of an individual in a messaging application is shown. As shown at block 402, the method 400 includes obtaining historical usage data for the individual for the messaging application. The method 400 also includes obtaining location data, activity data and calendar data for the individual, as shown at block 404. In exemplary embodiments, the activity data can include the activity of the individual on the device that the messaging application is being used on and/or the activity of the individual of the messaging application. Next, as shown at block 406, the method 400 includes calculating a current availability status of the individual based on the historical usage data, the location data, the activity data and the calendar data. In exemplary embodiments, the current availability status is calculated using machine learning and data analytic techniques that apply weighting factors to the various types of input data received. In exemplary embodiments, the current availability status score is a numerical value that is greater than or equal to zero and less than or equal to ten and the availability status scores consists of one decimal place.

The method 400 also includes calculating a predicted future availability status for the individual based on the historical usage data, the location data, the activity data and the calendar data, as shown at block 408. The predicted future availability status includes predicted future availability status scores for each hour remaining in a current day. In exemplary embodiments, the predicted future availability status scores are numerical values that are greater than or equal to a minimum number, for example zero, and less than or equal to a maximum number, for example ten and the availability status scores consists of one decimal place.

Next, as shown at block 410, the method 400 includes providing the current availability status and the predicted future availability status to other users of the messaging application. In exemplary embodiments, the current availability status of the individual is provided using a graphical user interface that includes a color indicator that has a pigment determined based on the current availability status score. In exemplary embodiments, the predicted future availability status of the individual is provided using a graphical user interface that includes color indicators for each hour remaining in the current day where a pigment of the color indicators is determined based on the predicted future availability status scores.

In exemplary embodiments, the methods for calculating and visualizing an availability of a user in a messaging system provides multiple technical benefits. First, the current and predicted future availability status scores are automatically set and do not require input from the user. Next, the reliability of an availability status is improved because it is based on a broad set of inputs that are continuously monitored and the availability status is automatically and continuously updated. In addition, as shown in FIGS. 3A, 3B and 3C, the user in a messaging system provides multiple technical benefits. First, the current availability information can be easily visualized and it can be customized for a mobile environment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method for determining and providing an availability status of an individual in a messaging application, the method comprising:
    obtaining historical usage data for the individual for the messaging application;
    obtaining location data, activity data and calendar data for the individual;

calculating, by a processor, a current availability status for the individual based on the historical usage data, the location data, the activity data and the calendar data;

calculating, by the processor, a predicted future availability status for the individual based one or more of on the historical usage data, the location data, the activity data and the calendar data; and providing the current availability status and the predicted future availability status to other users of the messaging application, wherein the predicted future availability status includes predicted future availability status scores for each hour remaining in a current day and wherein the predicted future availability status scores are numerical values that are greater than or equal to a minimum number and less than or equal to a maximum number and wherein the predicted future availability status scores consists of one decimal place.

2. The method of claim 1, wherein the predicted future availability status of the individual is provided using a graphical user interface that includes color indicators for each hour remaining in the current day where a pigment of the color indicators is determined based on the predicted future availability status scores.

3. The method of claim 1, wherein the current availability status includes a current availability status score.

4. The method of claim 3, wherein the current availability status score is a numerical value that that is greater than or equal to a minimum number and less than or equal to a maximum number and wherein the current availability status score consists of one decimal place.

5. The method of claim 3, wherein the current availability status of the individual is provided using a graphical user interface that includes a color indicator that has a pigment determined based on the current availability status score.

6. A computer program product for determining and providing an availability status of an individual in a messaging application, the computer program product comprising:

a non-transitory storage medium readable by a processing circuit and storing instructions for execution by the processing circuit for performing a method comprising:

obtaining historical usage data for the individual for the messaging application;

obtaining location data, activity data and calendar data for the individual;

calculating a current availability status for the individual based on the historical usage data, the location data, the activity data and the calendar data;

calculating a predicted future availability status for the individual based on one or more of the historical usage data, the location data, the activity data and the calendar data; and providing the current availability status and the predicted future availability status to other users of the messaging application, wherein the predicted future availability status includes predicted future availability status scores for each hour remaining in a current day and wherein the predicted future availability status scores are numerical values that are greater than or equal to a minimum number and less than or equal to a maximum number and wherein the predicted future availability status scores consists of one decimal place.

7. The computer program product of claim 6, wherein the predicted future availability status of the individual is provided using a graphical user interface that includes color indicators for each hour remaining in the current day where a pigment of the color indicators is determined based on the predicted future availability status scores.

8. The computer program product of claim 6, wherein the current availability status includes a current availability status score.

9. The computer program product of claim 8, wherein the current availability status score is a numerical value that is greater than or equal to a minimum number and less than or equal to a maximum number and wherein the current availability status score consists of one decimal place.

10. The computer program product of claim 8, wherein the current availability status of the individual is provided using a graphical user interface that includes a color indicator that has a pigment determined based on the current availability status score.

11. A processing system for determining and providing an availability status of an individual in a messaging application includes a processor configured to control a content displayed on a display screen, the processor configured to:

obtain historical usage data for the individual for the messaging application;

obtain location data, activity data and calendar data for the individual;

calculate a current availability status for the individual based on the historical usage data, the location data, the activity data and the calendar data;

calculate a predicted future availability status for the individual based on one or more of the historical usage data, the location data, the activity data and the calendar data; and providing the current availability status and the predicted future availability status to other users of the messaging application, wherein the predicted future availability status includes predicted future availability status scores for each hour remaining in a current day and wherein the predicted future availability status scores are numerical values that are greater than or equal to a minimum number and less than or equal to a maximum number and wherein the predicted future availability status scores consists of one decimal place.

12. The processing system of claim 11, wherein the predicted future availability status of the individual is provided using a graphical user interface that includes color indicators for each hour remaining in the current day where a pigment of the color indicators is determined based on the predicted future availability status scores.

13. The processing system of claim 11, wherein the current availability status includes a current availability status score.

14. The processing system of claim 13, wherein the current availability status score is a numerical value that is greater than or equal to a minimum number and less than or equal to a maximum number and wherein the current availability status score consists of one decimal place.

* * * * *